(12) United States Patent
Schalk et al.

(10) Patent No.: US 10,947,906 B2
(45) Date of Patent: Mar. 16, 2021

(54) METHOD FOR OPERATING AN INTERNAL COMBUSTION ENGINE, AND INTERNAL COMBUSTION ENGINE

(71) Applicant: MTU FRIEDRICHSHAFEN GMBH, Friedrichshafen (DE)

(72) Inventors: Johannes Schalk, Friedrichshafen (DE); Wolfgang Fimml, Hörbranz (AT); Christian Frey, Salem (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/493,795

(22) PCT Filed: Mar. 21, 2018

(86) PCT No.: PCT/EP2018/057199
§ 371 (c)(1),
(2) Date: Sep. 13, 2019

(87) PCT Pub. No.: WO2018/172421
PCT Pub. Date: Sep. 27, 2018

(65) Prior Publication Data
US 2020/0011260 A1   Jan. 9, 2020

(30) Foreign Application Priority Data
Mar. 24, 2017   (DE) .................... 10 2017 205 034.9

(51) Int. Cl.
*F02D 13/02*   (2006.01)
*F02D 41/14*   (2006.01)
*F02D 41/00*   (2006.01)

(52) U.S. Cl.
CPC ..... *F02D 13/0223* (2013.01); *F02D 13/0215* (2013.01); *F02D 13/0226* (2013.01);
(Continued)

(58) Field of Classification Search
CPC ............. F02D 13/0215; F02D 13/0257; F02D 13/0226; F02D 13/0223; F02D 2041/001
(Continued)

(56) References Cited

U.S. PATENT DOCUMENTS

| 2,717,583 A | 9/1955 | Maybach |
| 5,115,782 A | 5/1992 | Klinke |

(Continued)

FOREIGN PATENT DOCUMENTS

| AT | 517216 A4 | 12/2016 |
| DE | 4236008 A1 | 4/1994 |

(Continued)

OTHER PUBLICATIONS

JP2001090563A (Hayashi, K) (Apr. 3, 2001) Machine Translation, Retrieved from WIPO website, May 31, 2020.*

*Primary Examiner* — Mahmoud Gimie
(74) *Attorney, Agent, or Firm* — Lucas & Mercanti, LLP; Klaus P. Stoffel

(57) ABSTRACT

A method for operating an internal combustion engine, involving the following steps: determining a target lambda value and measuring an actual lambda value for combustion in a combustion chamber of an internal combustion engine; establishing, in accordance with the target lambda value and the actual lambda value, a point in time for an intake valve associated with the combustion chamber to open; and opening the intake valve at the established point in time.

10 Claims, 2 Drawing Sheets

(52) U.S. Cl.
CPC ..... *F02D 13/0234* (2013.01); *F02D 13/0257* (2013.01); *F02D 41/1454* (2013.01); *F02D 2041/001* (2013.01)

(58) Field of Classification Search
USPC ............ 701/103; 123/90.15, 90.16, 347, 348
See application file for complete search history.

(56) References Cited

U.S. PATENT DOCUMENTS

| | | | | |
|---|---|---|---|---|
| 5,685,264 | A * | 11/1997 | Allen | F01L 13/0005 123/90.16 |
| 6,125,828 | A * | 10/2000 | Hu | F01L 13/065 123/568.14 |
| 6,273,076 | B1 | 8/2001 | Beck | |
| 6,431,129 | B1 | 8/2002 | Hammoud | |
| 8,955,317 | B2 | 2/2015 | Schilling | |
| 2002/0121266 | A1 | 9/2002 | Nogi | |
| 2005/0188929 | A1 * | 9/2005 | Kawamura | F02D 41/1443 123/90.15 |
| 2007/0039577 | A1 * | 2/2007 | Hoffmann | F01L 13/0047 123/90.16 |
| 2008/0120016 | A1 * | 5/2008 | Ruiz | F02D 13/0219 701/105 |
| 2009/0194080 | A1 | 8/2009 | Bression | |
| 2010/0236238 | A1 | 9/2010 | Spiegel | |
| 2014/0338327 | A1 * | 11/2014 | Borean | F02D 13/0226 60/602 |
| 2018/0355805 | A1 | 12/2018 | Thalhauser | |

FOREIGN PATENT DOCUMENTS

| | | |
|---|---|---|
| DE | 19530274 A1 | 2/1997 |
| DE | 19546453 A1 | 6/1997 |
| DE | 10139941 A1 | 3/2002 |
| DE | 102004005588 A1 | 8/2005 |
| DE | 102005000621 A1 | 7/2006 |
| DE | 102013009896 A1 | 12/2014 |
| DE | 102016121125 A1 | 5/2017 |
| EP | 0433632 A1 | 6/1991 |
| EP | 2598739 B1 | 4/2015 |
| JP | 2001090563 A * | 4/2001 |
| JP | 2014015921 A * | 1/2014 |
| WO | 2013028168 A1 | 2/2013 |

* cited by examiner

METHOD FOR OPERATING AN INTERNAL COMBUSTION ENGINE, AND INTERNAL COMBUSTION ENGINE

CROSS-REFERENCE TO RELATED APPLICATIONS

The present application is a 371 of International application PCT/EP2018/057199, filed Mar. 21, 2018, which claims priority of DE 10 2017 205 034.9, filed Mar. 24, 2017, the priority of these applications is hereby claimed and these applications are incorporated herein by reference.

BACKGROUND OF THE INVENTION

The invention relates to a method for operating an internal combustion engine as well as an internal combustion engine.

For example, European patent specification EP 2 598 739 B1 discloses influencing an internal exhaust gas recirculation by suitable specification of an opening time of an inlet valve. It is in principle also possible to determine a fresh mass supplied to a combustion chamber of an internal combustion engine by specifying a closing time for an inlet valve. Here, however, the closing time of the inlet valve has a large influence on nitrogen oxide emissions of the internal combustion engine. It can therefore be advantageous to uncouple a control of a lambda value for the combustion chamber from a control of the nitrogen oxide emissions in so far as the nitrogen oxide emissions are controlled via the closing time of the inlet valve, wherein the lambda control is carried out in the case of a charged internal combustion engine via an exhaust gas turbine bypass. Such a configuration is, however, complex and expensive in particular because it requires additional components and an additional logic in order to provide the exhaust gas turbine bypass with a control element arranged therein and in order to actuate the control element, for example, a bypass flap.

SUMMARY OF THE INVENTION

The object on which the invention is based is to create a method for operating an internal combustion engine as well as an internal combustion engine which does not have the cited disadvantages.

The object is achieved in particular in that a method for operating an internal combustion engine is created which has the following steps: a setpoint lambda value is determined for a combustion in a combustion chamber of an internal combustion engine and an actual lambda value is measured. An opening time for an inlet valve assigned to the combustion chamber is determined as a function of the setpoint lambda value and as a function of the actual lambda value. The inlet valve is opened at a specific opening time. This enables on one hand an uncoupling of the control of nitrogen oxide emissions from a lambda control for the internal combustion engine because namely the nitrogen oxide emissions can be influenced via the closing time of the inlet valve, wherein the lambda value is influenced via the opening time. Both parameters, i.e. the lambda value and the nitrogen oxide emissions, can thus be controlled independently of one another. On the other hand, it does not require any additional components such as, for example, an exhaust gas turbine bypass and a control element arranged therein as well as no complicated actuation of such components. The internal combustion engine can have a simpler and lower cost structure overall. For adjustment of the opening time, a variable valve drive is preferably assigned to the inlet valve, which variable valve drive is, however, typically provided in any case in particular in order to be able to control the nitrogen oxide emissions. No additional components or measures are therefore required in this regard.

The term lambda value—in a per se normal and known manner—refers to a variable which indicates the combustion air/fuel ratio in the combustion chamber in relation to a stoichiometric combustion air/fuel ratio. The lambda value for a stoichiometric combustion air/fuel ratio in the combustion chamber is equal to 1 here. If an excess of combustion air is present, the combustion chamber therefore has a lean mixture, the lambda value is greater than 1. If, however, an excess of fuel is contained in the combustion chamber, a rich mixture is therefore present, the lambda value is less than 1.

A control of the lambda value, which is also referred to in short as lambda control, is preferably carried out in the course of the method. Control of the lambda value, in particular adjustment of the actual lambda value to a specific setpoint lambda value, is performed by adjustment of the opening time of the at least one inlet valve as an actuating variable.

According to a further development of the invention, it is provided that a setpoint nitrogen ratio for the exhaust gas of the combustion in the combustion chamber is determined, wherein an actual nitrogen oxide ratio in the exhaust gas is measured. A closing time for the inlet valve is determined as a function of the setpoint nitrogen oxide ratio and as a function of the actual nitrogen oxide ratio, and the inlet valve is closed at a specific closing time. In this manner, the nitrogen oxide emissions of the internal combustion engine can be adjusted, preferably controlled, via the closing time of the inlet valve, as was already explained above. In particular an uncoupling of the lambda control on one hand and the nitrogen oxide control on the other hand are carried out in that the lambda control is performed via the opening time of the inlet valve as an actuating variable, wherein the nitrogen oxide control is carried out via the closing time of the inlet valve as an actuating variable. In particular the nitrogen oxide ratio in the exhaust gas of the at least one combustion chamber is therefore preferably controlled, in particular the actual nitrogen oxide ratio is adjusted to the setpoint nitrogen oxide ratio in that the closing time of the inlet valve is changed as an actuating variable.

The term uncoupling refers here to the fact that the lambda control on one hand and the nitrogen oxide control on the other hand are carried out via different actuating variables. There is nevertheless in principle a certain dependency in particular between the lambda value and the closing time.

A cascaded control or a combined multiple variable control is therefore preferably carried out in such a manner that a first variable, selected from lambda control and nitrogen oxide control, is adjusted initially by variation of a first actuating variable, selected from the opening time and the closing time of the inlet valve, wherein thereafter—preferably in the case of an ascertained first actuating variable—the second variable, selected from lambda control and nitrogen oxide control, is adjusted by variation of the second actuating variable, selected from the opening time and the closing time of the inlet valve.

The nitrogen oxide emissions are initially preferably adjusted by variation of the closing time of the inlet valve. An adjustment of the resultant displacement of the lambda value is performed by variation of the opening time of the inlet valve.

It is possible that the method is carried out iteratively, wherein, after the adjustment of the second variable, a readjustment of the first variable is carried out, which can in principle be continued cyclically in particular until the setpoint values assigned to the various variables are adjusted to a predetermined extent.

The term nitrogen oxide ratio refers here in particular to a nitrogen oxide concentration and/or a nitrogen oxide partial pressure in the exhaust gas of the at least one combustion chamber. This can be a concentration or a partial pressure of nitrogen monoxide, of nitrogen dioxide, or a total concentration of a total partial pressure as a sum of the respective ratios of nitrogen monoxide and nitrogen dioxide.

According to a further development of the invention, it is provided that the specific opening time within an intake stroke of the combustion chamber is delayed to reduce the actual lambda value, wherein the specific opening time within an intake stroke is brought forward to increase the actual lambda value. The terms delay and bring forward refer to a crankshaft angle of the internal combustion engine preferably formed as a reciprocating piston engine, wherein a piston is displaceable in the combustion chamber in a stroke-movable manner between an upper dead center and a lower dead center, wherein the intake stroke comprises a stroke movement of the piston from the upper dead center to the lower dead center, wherein the term delay refers to a time or crankshaft angle which is closer to the lower dead center of the piston than a time which is designated as brought forward. If, in the case of an ascertained closing time of the inlet valve, it is opened earlier in the intake stroke, a larger air mass can be conveyed into the combustion chamber than if the inlet valve is opened later. In the case of a given fuel supply and ascertained closing time, a later opening of the inlet valve therefore leads to a richer mixture, i.e. a reduction in the actual lambda value, wherein an earlier opening leads to a leaner mixture, thus to an increase in the actual lambda value. In this manner, in particular lambda control can be performed by variation of the opening time of the inlet valve.

It is alternatively or additionally provided that the specific opening time is assigned to an inlet valve stroke which is performed in addition to a gas exchange stroke of the inlet valve. The inlet valve therefore performs two—preferably separate and in particular complete—valve strokes, namely a gas exchange stroke for the supply of fresh mass into the combustion chamber, and additionally the further inlet valve stroke for adjusting the lambda value. Here, the specific opening time for adjusting the lambda value is selected outside the intake stroke, in particular in an outlet stroke and/or in a compression stroke of the combustion chamber.

If the additional inlet valve stroke is carried out with the specific opening time in the outlet stroke, exhaust gas can be discharged out of the combustion chamber into a loading path of the internal combustion engine via the inlet valve, wherein this exhaust gas is then conveyed back into the combustion chamber in the following intake stroke during the gas exchange stroke of the inlet valve. The exhaust gas is thus quasi stored on a preliminary basis in the loading path. A corresponding reduced air mass is conveyed into the combustion chamber, which in turn influences the lambda value. This preliminary storage of exhaust gas in the loading path also leads among other things in a subsequent operating stroke to a higher inert gas ratio in the combustion chamber. This acts—in a similar manner to an external exhaust gas recirculation—to reduce the combustion temperature level which results in a reduction in the specific nitrogen oxide emissions.

If the additional inlet valve stroke is performed with the specific opening time in the compression stroke of the combustion chamber, a part of the combustion air taken in in the intake stroke is discharged again into the loading path so that the air mass arranged in the combustion chamber is reduced and thus at the same time the lambda value is also influenced.

If the specific opening time is assigned a further, additional inlet valve stroke, it is possible that the opening time of the additional inlet valve stroke itself is not varied, wherein rather the closing time assigned to the additional inlet valve stroke and/or the stroke path, i.e. the stroke amplitude of the inlet valve, can be varied for lambda control. However, it is in particular possible, for the purpose of lambda control, to either provide or omit the additional inlet valve stroke and/or to perform the additional inlet valve stroke optionally in the outlet stroke or in the compression stroke.

The internal combustion engine is preferably formed as a four-stroke engine, wherein the combustion chamber is assigned four strokes per operating cycle in a manner known per se, namely an intake stroke, a compression stroke, an operating or combustion stroke, and an outlet stroke. The times described here, in particular the opening time and the closing time of the inlet valve, relate to times described in particular by the crankshaft angle of the internal combustion engine within periodically recurring operating cycles.

The fact that the gas exchange stroke and the additional inlet valve stroke are preferably separated from one another means in particular that the inlet valve fully closes between the gas exchange stroke and the additional inlet valve stroke. These are preferably separate stroke movements of the inlet valve which are separated from one another and preferably not partial strokes of a single stroke event.

The closing time of the inlet valve which is used as an actuating variable for the nitrogen oxide control is preferably assigned to the gas exchange stroke. In this manner, the Miller effect which is known per se can be used to influence the nitrogen oxide emissions of the internal combustion engine. In this manner, a further separation of the nitrogen oxide control and lambda control on the other hand from one another occurs in that the nitrogen oxide control is assigned to the gas exchange stroke, wherein the lambda control is assigned to the additional inlet valve stroke.

The object is also achieved in that an internal combustion engine is created which has at least one combustion chamber to which at least one inlet valve for the supply of fresh mass into the at least one combustion chamber is assigned. The internal combustion engine furthermore has a lambda adjustment device which is configured to adjust a lambda value for a combustion in the at least one combustion chamber. The lambda value adjustment device is operatively connected to the at least one inlet valve and configured to adjust an actual lambda value for the at least one combustion chamber by determining an opening time for the at least one inlet valve. In the context of the internal combustion engine, in particular the advantages which were already explained in the context of the method arise. The internal combustion engine is preferably configured to carry out a method according to any one of the embodiments described above.

The lambda value adjustment device is preferably configured to control the lambda value, i.e. for lambda control, wherein the opening time of the at least one inlet valve is used as an actuating variable in order to adjust the actual lambda value to a specific setpoint lambda value.

The internal combustion engine preferably has a lambda value measuring device, in particular a lambda probe, for measurement of the actual lambda value, and furthermore preferably a determination element to determine a setpoint lambda value which is particularly preferably determined as a function of an operating or load point of the internal combustion engine.

The internal combustion engine preferably has a boost pressure sensor for detection of a boost pressure in a loading path upstream of the at least one inlet value as well as a charge air temperature sensor for detection of a charge air temperature upstream of the at least one inlet valve. With the aid of the detected boost pressure and the detected charge air temperature, it is then possible via a gas law known per se, for example, via the ideal gas law, to determine a suitable opening time for the inlet valve in order to adjust the desired lambda value.

According to a further development of the invention, the internal combustion engine has a nitrogen oxide ratio adjustment device which is configured to adjust a nitrogen oxide ratio for exhaust gas of the combustion in the at least one combustion chamber. The nitrogen oxide ratio adjustment device is operatively connected to the at least one inlet valve and configured to adjust an actual nitrogen oxide ratio for the at least one combustion chamber by variation of a closing time of the at least one inlet valve.

The nitrogen oxide ratio adjustment device is preferably configured to control the nitrogen oxide ratio in the exhaust gas of the at least one combustion chamber, wherein the closing time of the inlet valve is used as the actuating variable.

According to a further development of the invention, it is provided that the lambda value adjustment device is configured to delay the opening time of the inlet valve within an intake stroke of the at least one combustion chamber in order to reduce the actual lambda value and bring it forward to increase the actual lambda value.

Alternatively or additionally, the lambda value adjustment device is preferably configured to perform an additional inlet valve stroke in addition to a gas exchange stroke of the inlet valve, wherein the opening time determined by the lambda value adjustment device is assigned to the additional inlet valve stroke, wherein an opening stroke of the inlet valve is performed at an opening time outside the intake stroke, in particular in an outlet stroke and/or in a compression stroke of the combustion chamber. It is also possible in this case that the lambda value adjustment device is configured to vary a closing time assigned to the additional inlet valve stroke for the purpose of lambda control.

According to a further development of the invention, it is provided that a valve drive which has a hydraulic interruption device is assigned to the at least one inlet valve. Here, an operative connection between an actuating means for the inlet valve, for example, an actuating cam, and the inlet valve can be temporarily interrupted by means of the hydraulic interruption device. Such a hydraulic interruption device is also referred to as a lost motion system and is known per se, hence its configuration is not discussed in further detail. A variable valve drive, in particular a fully variable valve drive, can be provided with the aid of the hydraulic interruption device, wherein it is in particular possible to influence both the opening time of the inlet valve and the closing time thereof independently of one another with the aid of the hydraulic interruption device. Overall, the hydraulic interruption device enables a complete modulation of the valve stroke curve for the inlet valve, wherein not only the opening and closing times can be adjusted, rather the stroke path can also be varied.

According to a further development of the invention, it is provided that the at least one inlet valve is assigned at least two actuating cams which have actuating contours which are phase-displaced relative to one another. The term actuating contour refers to a contour of an outer circumferential surface of an actuating cam which brings about a valve stroke if the actuating contour of the actuating cam comes into engagement with an actuating element on which the actuating cam rolls. The fact that the actuating contours of the actuating cams are phase-displaced relative to one another means in particular that the actuating contours are arranged relative to one another such that they bring about in each case a valve stroke at different times, i.e. in particular in different crankshaft angle regions, particularly preferably in crankshaft angle regions which are separate from one another. By means of the two actuating cams and the actuating contours which are phase-displaced relative to one another, it is easily possible to enable a further, additional inlet valve stroke in addition to a gas exchange stroke of the inlet valve.

Alternatively or additionally, the at least one inlet valve is preferably assigned an actuating cam which has on its circumferential surface two separate valve stroke surface regions. The term valve stroke surface region refers here to a region of the circumferential surface of the actuating cam which is configured to bring about a valve stroke of the inlet valve if the actuating cam rolls with the valve stroke surface region on an actuating element. By means of an actuating cam having two separate valve stroke surface regions, it is possible to generate a further, additional inlet valve stroke in addition to the gas exchange stroke with only one actuating cam. In this case, the valve drive is particularly preferably assigned a hydraulic interruption device with which it is in particular possible to influence the valve strokes assigned to the separate valve stroke surface regions and in particular also entirely omit at least one of the valve strokes, i.e. deactivate one of the valve stroke surface regions.

According to a further development of the invention, it is provided that the internal combustion engine has an exhaust gas turbo charger with an exhaust gas turbine in an exhaust gas path of the internal combustion engine and with a fresh mass compressor in a loading path of the internal combustion engine, wherein the exhaust gas turbine is operatively drive-connected to the fresh mass compressor in a manner known per se so that enthalpy of the exhaust gas can be used to compress fresh mass in the loading path and thus increase the boost pressure. The internal combustion engine is preferably free from a bypass path which bypasses the exhaust gas turbine and/or the fresh mass compressor. Such a bypass path is in particular no longer required since the opening time of the inlet valve is used for lambda control of the internal combustion engine as an actuating variable. The internal combustion engine particularly preferably has neither a bypass path to bypass the exhaust gas turbine nor a bypass path to bypass the fresh mass compressor, in particular therefore neither a turbine bypass nor a compressor bypass.

According to a further development of the invention, it is provided that the internal combustion engine has a loading path, along which fresh mass, in particular combustion air, can be conveyed, wherein the loading path is connected in terms of flow to the at least one combustion chamber via the at least one inlet valve for the supply of fresh mass into the at least one combustion chamber. It is provided in this case that the loading path is free from a throttle flap. The internal combustion engine preferably has no throttle flap. A throttle flap can advantageously be omitted since the opening time of the inlet valve is used as an actuating variable for lambda control.

Other control elements of the loading path can also advantageously be omitted, for example, additional flaps for thermomanagement or the like.

The internal combustion engine is preferably formed as a reciprocating piston engine. It is possible that the internal combustion engine is configured to drive a car, a heavy goods vehicle or a utility vehicle. In the case of one preferred exemplary embodiment, the internal combustion engine serves to drive in particular heavy land or water vehicles, for example, mining vehicles, trains, wherein the internal combustion engine is used in a locomotive or a railcar, or ships. A use of the internal combustion engine to drive a vehicle used for defense purposes, for example, a tank, is also possible. An exemplary embodiment of the internal combustion engine is preferably also used in a stationary manner, for example, for stationary energy supply in emergency power operation, continuous load operation or peak load operation, wherein the internal combustion engine in this case preferably drives a generator. A stationary use of the internal combustion engine for driving auxiliary units, for example, fire extinguishing pumps on oil rigs, is also possible. A use of the internal combustion engine in the field of conveying fossil raw materials and in particular fuels, for example, oil and/or gas, is furthermore possible. A use of the internal combustion engine in the industrial sector or in the construction sector, for example, in a construction or building machine, for example, in a crane or a digger, is also possible. The internal combustion engine is preferably formed as a diesel engine, as a petrol engine, as a gas engine for operation with natural gas, biogas, special gas or another suitable gas. In particular if the internal combustion engine is formed as a gas engine, it is suitable for use in a combined heat and power plant for stationary energy generation.

The descriptions of the method on one hand and the internal combustion engine on the other hand are to be understood to be complementary to one another. Features of the internal combustion engine which were explained explicitly or implicitly in conjunction with the method are preferably individual features or features which are combined with one another of a preferred exemplary embodiment of the internal combustion engine. Method steps which were explained explicitly or implicitly in conjunction with the internal combustion engine are preferably individual features or features which are combined with one another of a preferred embodiment of the method. This is preferably characterized by at least one method step which is brought about by at least one feature of an exemplary embodiment according to the invention or a preferred exemplary embodiment of the internal combustion engine. The internal combustion engine is preferably characterized by at least one feature which is brought about by at least one step of an embodiment according to the invention or a preferred exemplary embodiment of the method.

BRIEF DESCRIPTION OF THE DRAWING

The invention is explained in greater detail below on the basis of the drawing. In the drawing.

DETAILED DESCRIPTION OF THE INVENTION

Figure 1:
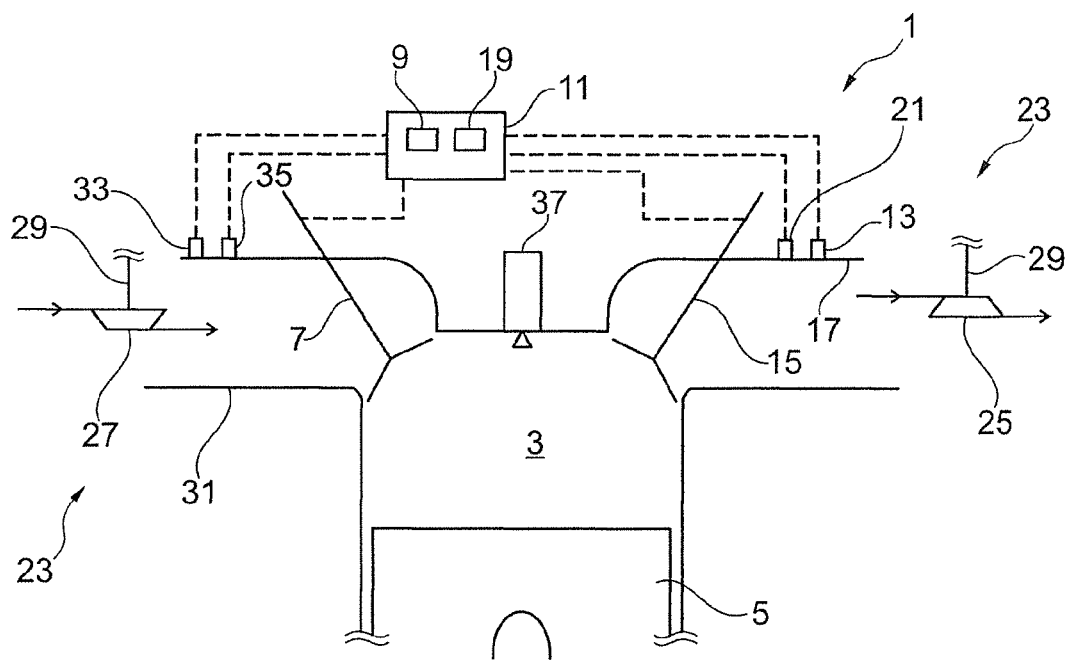
FIG. 1 shows a schematic representation of a first exemplary embodiment of an internal combustion engine.

FIG. 1 shows a schematic representation of a first exemplary embodiment of an internal combustion engine 1 which has at least one combustion chamber 3. Internal combustion engine 1 is formed as a reciprocating piston engine, wherein a piston 5 is arranged in a stroke-movable manner in combustion chamber 3 between an upper dead center and a lower dead center.

Combustion chamber 3 is assigned an inlet valve 7 for the supply of fresh mass, in particular combustion air, into the at least one combustion chamber 3.

Internal combustion engine 1 furthermore has a lambda value adjustment device 9 which is configured to adjust a lambda value for a combustion in the at least one combustion chamber 3. In the case of the exemplary embodiment represented here, lambda value adjustment device 9 is preferably part of a control unit 11, or the functionality of lambda value adjustment device 9 is implemented in control unit 11, for example, in the form of a software module or the like. Lambda value adjustment device 9 is operatively connected to the at least one inlet valve 7 and configured to adjust an actual lambda value for the at least one combustion chamber 3 by determining the opening time for the at least one inlet valve 7.

A setpoint lambda value is preferably determined by means of lambda value adjustment device 9, preferably in an operating point-dependent manner, and an actual lambda value is measured for a combustion in combustion chamber 3. To this end, internal combustion engine 1 preferably has a lambda probe 13 in an exhaust gas path 17 connected in terms of flow via at least one outlet valve 15 to combustion chamber 3. Lambda probe 13 is operatively connected to lambda value adjustment device 9 to determine the instantaneous actual lambda value. An opening time for inlet valve 7 is determined by means of lambda value adjustment device 9 as a function of the setpoint lambda value and the actual lambda value and inlet valve 7 is opened at a specific opening time.

In particular, lambda value adjustment device 9 is configured for control of the lambda value, i.e. for lambda control, wherein the opening time of inlet valve 7 is preferably used as an actuating variable in order to adjust the actual lambda value to the setpoint lambda value.

Internal combustion engine 1 preferably has a nitrogen oxide adjustment device 19 which is also part of control unit 11 or integrated into it, in particular as a software module, wherein nitrogen oxide ratio adjustment device 19 is configured to adjust a nitrogen oxide ratio in the exhaust gas of the combustion in the at least one combustion chamber 3. Nitrogen oxide ratio adjustment device 19 is also operatively connected to the at least one inlet valve 7 and configured to adjust an actual nitrogen oxide ratio for the at least one combustion chamber by variation of a closing time of the at least one inlet valve 7. In particular, nitrogen oxide ratio adjustment device 19 is configured to control the nitrogen oxide emissions of internal combustion engine 1 by means of the closing time of inlet valve 7 as an actuating variable.

Nitrogen oxide ratio adjustment device 19 is preferably configured to determine a setpoint nitrogen oxide ratio—preferably on an operating point-dependent basis—for the exhaust gas of the combustion in combustion chamber 3 and in order to measure an actual nitrogen oxide ratio in the exhaust gas. For this purpose, a nitrogen oxide sensor 21 is preferably arranged in exhaust gas path 17, which nitrogen oxide sensor 21 is operatively connected to nitrogen oxide ratio adjustment device 19 in order to detect the instantaneous actual nitrogen oxide ratio. A closing time for inlet valve 7 is then determined by means of nitrogen oxide ratio adjustment device 19 as a function of the setpoint nitrogen oxide ratio and the instantaneous actual nitrogen oxide ratio and inlet valve 7 is closed at a specific closing time. In this manner, the actual nitrogen oxide ratio can be adjusted to the setpoint nitrogen oxide ratio in that the closing time of inlet valve 7 is used as an actuating variable.

With lambda value adjustment device 9, the opening time of inlet valve 7 within an intake stroke of the at least one combustion chamber 3 is preferably delayed to reduce the actual lambda value and brought forward to increase the actual lambda value. Alternatively or additionally, an additional inlet valve stroke is preferably performed in addition to a gas exchange stroke of inlet valve 7 so that the opening time determined by lambda value adjustment device 9 is assigned to the additional inlet valve stroke, wherein an opening stroke of inlet valve 7 is performed at an opening time outside the intake stroke, in particular in an outlet stroke and/or in a compression stroke of combustion chamber 3. It is also possible here that lambda value adjustment device 9 is configured to vary a closing time assigned to the additional inlet valve stroke for the purpose of lambda control.

Figure 2:
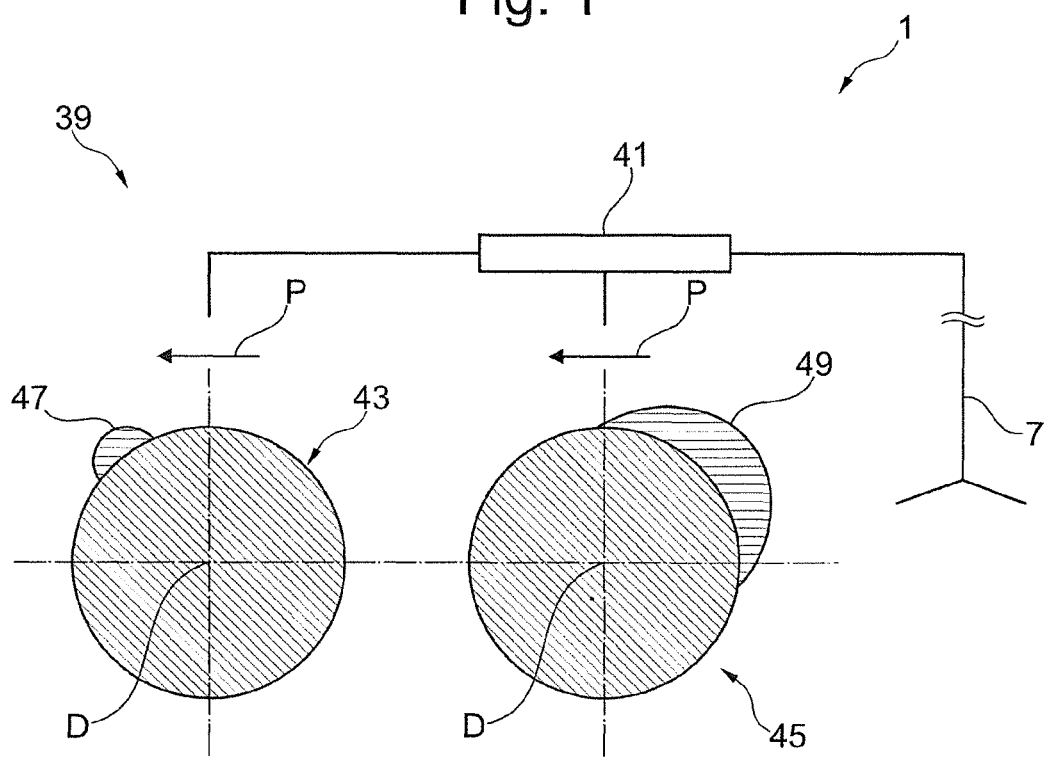
FIG. 2 shows a schematic detailed representation of a second exemplary embodiment of an internal combustion engine.
Figure 3:
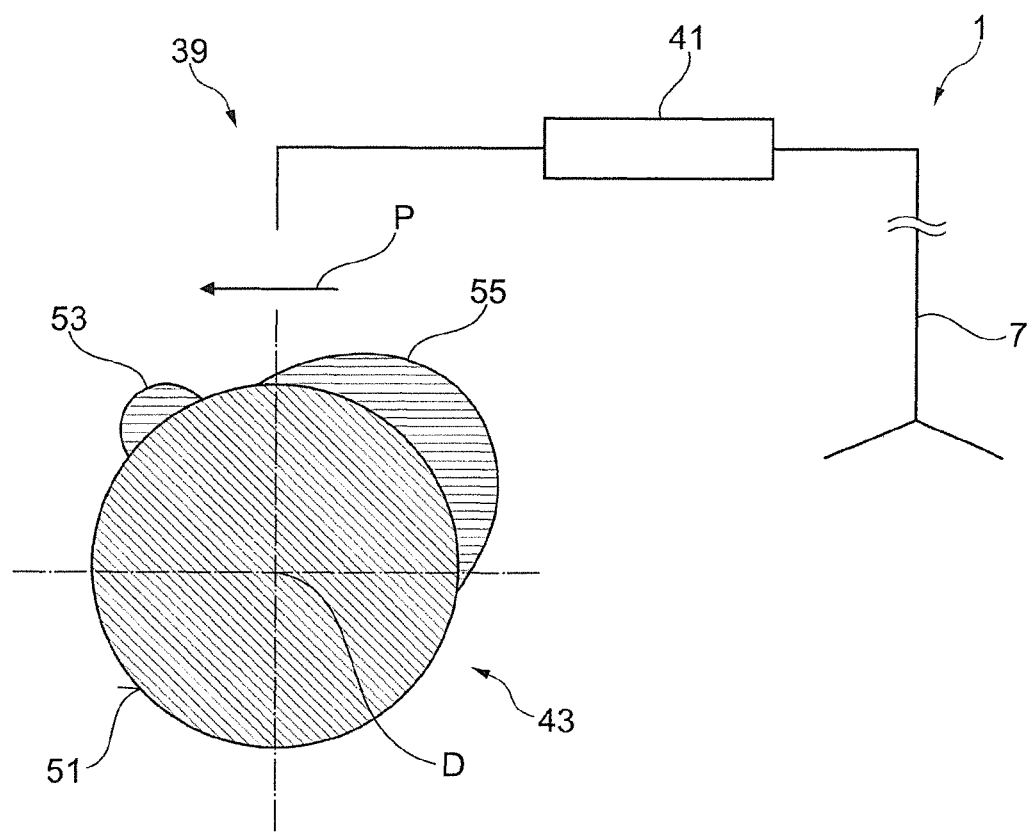
FIG. 3 shows a schematic detailed representation of a third exemplary embodiment of an internal combustion engine.

A valve drive represented in FIGS. 2 and 3 is preferably assigned to the at least one inlet valve 7, which valve drive has a hydraulic interruption device, in particular what is known as a lost motion system.

The at least one inlet valve 7 is preferably assigned at least two actuating cams represented in FIG. 2 which have actuating contours which are phase-displaced relative to one another. Alternatively or additionally, the at least one inlet valve 7 is preferably assigned an actuating cam represented in FIG. 3, in particular precisely one and only one actuating cam, which has two separate valve stroke surface regions on its circumferential surface. In this manner, valve strokes of inlet valve 7 which are separate from one another can be performed with a single actuating cam, wherein the valve strokes can be influenced by a hydraulic interruption device and can also in each case be deactivated.

Internal combustion engine 1 furthermore has an exhaust gas turbo charger 23 with an exhaust gas turbine 25 and a fresh mass compressor 27, wherein exhaust gas turbine 25 is preferably operatively drive-connected via a shaft 29, only represented schematically here, to fresh mass compressor 27.

In this case, internal combustion engine 1 is free from a bypass path which bypasses exhaust gas turbine 25. Additionally or alternatively, internal combustion engine 1 is free from a bypass path which bypasses fresh mass compressor 27.

Internal combustion engine 1 furthermore has a loading path 31, along which fresh mass can be conveyed, wherein loading path 31 is connected in terms of flow to combustion chamber 3 via inlet valve 7 for the supply of fresh mass into the at least one combustion chamber 3. In this case, loading path 31 is free from a throttle flap.

Loading path 31 preferably has no loading path control elements, in particular no flaps, in particular neither a throttle flap nor additional flaps, in particular for thermo-management.

A boost pressure sensor 33 and a charge air temperature sensor 35 which are operatively connected to control unit 11 and in particular to lambda value adjustment device 9 are preferably arranged in loading path 31. It is in particular possible to determine with the aid of the detected boost pressure and the detected charge air temperature which air mass is actually supplied to combustion chamber 3 as a function of the opening characteristics of the at least one inlet valve 7. The measurement values of boost pressure sensor 33 and charge air temperature sensor 35 are preferably called on for lambda control by lambda value adjustment device 9.

Internal combustion engine 1 furthermore preferably has an injector 37 assigned to combustion chamber 3 for direct injection of fuel into combustion chamber 3. In this case, it is possible to supply pure charge air temperature, without fuel, along loading path 31 to combustion chamber 3, wherein the fuel is introduced separately and directly via injector 37 into combustion chamber 3. This enables a particularly precise and simple lambda control via the opening time of inlet valve 7.

FIG. 2 shows a schematic detailed representation of a second exemplary embodiment of internal combustion engine 1. Identical elements and elements with an identical function are provided with identical reference numbers, thus in this regard reference is made to the description above. In particular, FIG. 2 shows a valve drive 39 which has a hydraulic interruption device 41. This is formed in particular as what is known as a lost motion system, wherein such hydraulic interruption devices 41 and corresponding valve drives 39 are known per se, hence this is not discussed further in detail.

Valve drive 39 is operatively connected to inlet valve 7 in order to in particular bring about a variable inlet stroke of inlet valve 7.

In the case of the second exemplary embodiment according to FIG. 2, there are assigned to inlet valve 7 and in particular valve drive 39 two actuating cams, namely a first actuating cam 43 and a second actuating cam 45, which rotate during operation of internal combustion engine 1 about an axis of rotation D in the defined direction, here in an anti-clockwise direction in the direction of an arrow P. Actuating cams 43, 45 interact in a manner known per se with valve drive 39 for actuation of inlet valve 7, in particular to bring about valve strokes of inlet valve 7.

Here, actuating cams 43, 45 have actuating contours which are phase-displaced relative to one another, wherein namely first actuating cam 43 has a first actuating contour 47, and wherein second actuating cam 45 has a second actuating contour 49. Actuating contours 47, 49 are here formed differently from one another, therefore also bring about differently configured inlet valve strokes of inlet valve 7, wherein they bring about these at different times since they are arranged phase-displaced relative to one another on actuating cams 43, 45.

FIG. 3 shows a schematic detailed view of a third exemplary embodiment of internal combustion engine 1. Identical elements and elements with an identical function are provided with identical reference numbers, thus in this regard reference is made to the description above. The third exemplary embodiment represented here differs from the second exemplary embodiment according to FIG. 2 in that here only one actuating cam 43 is provided which has on its circumferential surface 51 two separate valve stroke surface regions, namely a first valve stroke surface region 53 and a second valve stroke surface region 55. Here, first valve stroke surface region 53 corresponds to first actuating contour 47 according to FIG. 2, wherein second valve stroke surface region 55 corresponds to second actuating contour 49 according to FIG. 2. Separate valve strokes of inlet valve 7 can be performed by means of actuating cam 43 having two valve stroke surface regions 53, 55, as is also possible with the two actuating cams 43, 45 in the case of the second exemplary embodiment according to FIG. 2, wherein, however, one actuating cam can be spared in the case of the exemplary embodiment according to FIG. 3.

Figure 4:
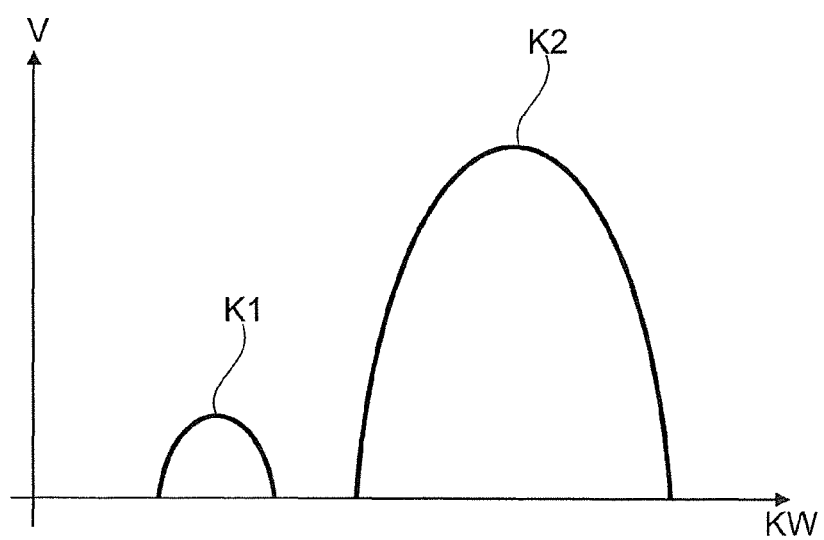
FIG. 4 shows a schematic, diagrammatic representation of a mode of operation of the second and third exemplary embodiment of the internal combustion engine according to FIGS. 2 and 3.

FIG. 4 shows a schematic, diagrammatic representation of a mode of operation of the second exemplary embodiment and of the third exemplary embodiment according to FIGS. 2 and 3. Here, a valve stroke V is plotted against crankshaft angle KW. A first valve stroke curve K1 describes a first inlet valve stroke of inlet valve 7 which is brought about by first actuating contour 47 or first valve stroke surface region 53 and which corresponds to the additional inlet valve stroke explained above.

A second valve stroke curve K2 describes a second inlet valve stroke of inlet valve 7 which corresponds to the main inlet valve stroke and which is brought about by second actuating contour 49 or second valve stroke surface region 55.

It is again clear on the basis of a diagram according to FIG. 4 that separate, different valve strokes of inlet valve 7 can be carried out by means of differently formed actuating contours 47, 49 or differently formed valve stroke surface regions 53, 55, in particular a main inlet valve stroke and an upstream inlet valve stroke which corresponds to the additional inlet valve stroke explained above.

It has been shown overall that, with internal combustion engine 1 proposed here and the method, a simplified procedure which is reduced in terms of the components used for at least substantial uncoupling of lambda control from nitrogen oxide emission control can be achieved.

The invention claimed is:

1. A method for operating an internal combustion engine, comprising the steps of:
   determining a setpoint lambda value and measuring an actual lambda value for a combustion in a combustion chamber of an internal combustion engine;
   determining an opening time for an inlet valve assigned to the combustion chamber as a function of the setpoint lambda value and the actual lambda value;
   opening the inlet valve at the determined opening time;
   determining a setpoint nitrogen oxide ratio for exhaust gas of the combustion in the combustion chamber and measuring an actual nitrogen oxide ratio in the exhaust gas;
   determining a closing time for the inlet valve as a function of the setpoint nitrogen oxide ratio and of the actual nitrogen oxide ratio; and
   closing the inlet valve at the determined closing time, wherein a cascaded control or a combined multi-variable control is carried out so that initially by varying the opening time of the inlet valve, a first variable selected from the lambda control is regulated, wherein subsequently a second variable selected from the nitrogen oxide control, is regulated by varying the closing time of the inlet valve, wherein a fully variable valve drive is provided by way of a hydraulic interruption device, the hydraulic Interrupting device being set up to temporarily interrupt an operative connection between an actuator for the inlet valve and the inlet valve.

2. The method according to claim 1, including
   a) delaying the determined opening time within an intake stroke of the combustion chamber to reduce the actual lambda value and advancing the opening time to increase the actual lambda value, and/or
   b) assigning the determined opening time to an inlet valve stroke performed in addition to a gas exchange stroke of the inlet valve, wherein the opening time is selected outside the intake stroke.

3. The method according to claim 2, wherein in step b) the opening time is selected in an outlet stroke and/or in a compression stroke of the combustion chamber.

4. An internal combustion engine, comprising:
   at least one combustion chamber;
   at least one inlet valve assigned to the at least one combustion chamber to supply fresh mass;
   a lambda value adjustment device configured to adjust a lambda value for a combustion in the at least one combustion chamber,
   wherein the lambda value adjustment device is operatively connected to the at least one inlet valve and is configured to adjust an actual lambda value for the at least one combustion chamber by determining an opening time of the at least one inlet valve; and
   a nitrogen oxide ratio adjustment device configured to adjust a nitrogen oxide ratio for exhaust gas of the combustion in the at least one combustion chamber, wherein the nitrogen oxide ratio adjustment device is operatively connected to the at least one inlet valve and is configured to adjust an actual nitrogen oxide ratio for the at least one combustion chamber by varying a closing time of the at least one inlet valve,
   wherein the internal combustion engine is configured to carry out a cascaded control or a combined multi-variable control, in such a way that initially by varying a first control variable selected from the opening and closing times of the inlet valve, a first variable selected from the lambda control and the nitrogen oxide control is adjusted, after which a second variable, selected from the lambda control and the nitrogen oxide control, is adjusted by varying the second control variable, selected from the opening time and the closing time of the inlet valve.

5. The internal combustion engine according to claim 4, wherein the lambda value adjustment device is configured to delay the opening time of the inlet valve within an intake stroke of the at least one combustion chamber in order to reduce the actual lambda value and advance the opening time to increase the actual lambda value and/or to perform an additional inlet valve stroke in addition to a gas exchange stroke of the inlet valve so that the opening time determined by the lambda value adjustment device is assigned to the additional inlet valve stroke, wherein an opening stroke of the inlet valve is performed at an opening time outside the intake stroke.

6. The internal combustion engine according to claim 5, wherein the opening stroke of the inlet valve is performed in an outlet stroke and/or in a compression stroke of the combustion chamber.

7. The internal combustion engine according to claim 4, further comprising a valve drive assigned to the at least one inlet valve, the valve drive having an hydraulic interruption device, wherein the hydraulic interruption device is configured to temporarily interrupt an operative connection between an actuator for the inlet valve and the inlet valve.

8. The internal combustion engine according to claim 4, wherein the at least one inlet valve is assigned
   a) at least two actuating cams that have actuating contours which are phase-displaced relative to one another, and/or
   b) an actuating cam that has a circumferential surface with two separate valve stroke surface regions.

9. The internal combustion engine according to claim 4, further comprising an exhaust gas turbo charger with an exhaust gas turbine and a fresh mass compressor, wherein internal combustion engine is free of a bypass path that bypasses the exhaust gas turbine and/or the fresh mass compressor.

10. The internal combustion engine according to claim 4, further comprising a loading path, along which fresh mass is conveyable, wherein the loading path is connected in terms of flow to the at least one combustion chamber via the at least one inlet valve for the supply of fresh mass into the at least one combustion chamber, wherein the loading path is free from a throttle flap.

\* \* \* \* \*